(12) United States Patent
Shoji et al.

(10) Patent No.: US 8,400,372 B2
(45) Date of Patent: Mar. 19, 2013

(54) PLASMA DISPLAY DEVICE AND METHOD OF DRIVING PLASMA DISPLAY PANEL

(75) Inventors: Hidehiko Shoji, Osaka (JP); Takahiko Origuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1239 days.

(21) Appl. No.: 12/092,040

(22) PCT Filed: Aug. 9, 2007

(86) PCT No.: PCT/JP2007/065581
§ 371 (c)(1),
(2), (4) Date: Apr. 29, 2008

(87) PCT Pub. No.: WO2008/018527
PCT Pub. Date: Feb. 14, 2008

(65) Prior Publication Data
US 2009/0122041 A1 May 14, 2009

(30) Foreign Application Priority Data

Aug. 10, 2006 (JP) .................................. 2006-218046

(51) Int. Cl.
*G09G 3/28* (2006.01)
(52) U.S. Cl. .......................................... 345/63; 345/208
(58) Field of Classification Search .............. 345/60–72, 345/208–210
See application file for complete search history.

(56) References Cited

U.S. PATENT DOCUMENTS

| 7,446,734 | B2 * | 11/2008 | Kigo et al. ...................... 345/60 |
| 2002/0130823 | A1 * | 9/2002 | Takayama ...................... 345/60 |
| 2005/0162344 | A1 | 7/2005 | Kang et al. |
| 2009/0009436 | A1 * | 1/2009 | Akamatsu et al. .............. 345/60 |

FOREIGN PATENT DOCUMENTS

| JP | 2000-242224 | 9/2000 |
| JP | 2005-148746 | 6/2005 |
| JP | 2006-53564 | 2/2006 |
| WO | WO 2005109388 A1 * | 11/2005 |
| WO | 2006/013658 | 2/2006 |
| WO | WO 2006103961 A1 * | 10/2006 |

OTHER PUBLICATIONS

International Search Report issued Sep. 4, 2007 in International (PCT) Application No. PCT/JP2007/065581.

* cited by examiner

*Primary Examiner* — Michael Pervan
(74) *Attorney, Agent, or Firm* — Wenderoth, Lind & Ponack, L.L.P.

(57) ABSTRACT

In displaying a predetermined image on a plasma display panel, occurrence of an initializing bright point can be suppressed to reduce the maximum voltage in an all-cell initializing operation, light emission in the all-cell initializing operation is suppressed to reduce the black luminance, and the contrast is sharpened. In driving the plasma display panel, one field period includes a plurality of subfields having a setup period for causing initializing discharge in discharge cells, an address period, and a sustain period. One field period includes at least one subfield for applying ramp waveform voltage increasing in the setup period to the scan electrodes. The maximum voltage of the ramp waveform voltage can be varied. When a predetermined image establishing a previously determined condition is displayed, the ramp waveform voltage is generated whose maximum voltage is smaller than when an image other than the predetermined image is displayed, and a positive voltage is applied to the data electrodes at least while the ramp waveform voltage having the smaller maximum voltage is applied to the scan electrodes.

8 Claims, 13 Drawing Sheets

PLASMA DISPLAY DEVICE AND METHOD OF DRIVING PLASMA DISPLAY PANEL

TECHNICAL FIELD

The present invention relates to a plasma display device used in a wall-hanging television (TV) or a large monitor, and a driving method of a plasma display panel.

BACKGROUND ART

A typical alternating-current surface discharge type panel used as a plasma display panel (hereinafter referred to as "panel") has many discharge cells between a front plate and a back plate that are faced to each other. The front plate has the following elements:
- a plurality of display electrode pairs disposed in parallel on a front glass substrate; and
- a dielectric layer and a protective layer for covering the display electrode pairs.

Here, each display electrode pair is formed of a pair of scan electrode and sustain electrode. The back plate has the following elements:
- a plurality of data electrodes disposed in parallel on a back glass substrate;
- a dielectric layer for covering the data electrodes;
- a plurality of barrier ribs disposed on the dielectric layer in parallel with the data electrodes; and
- phosphor layers disposed on the surface of the dielectric layer and on side surfaces of the barrier ribs.

The front plate and back plate are faced to each other so that the display electrode pairs and the data electrodes three-dimensionally intersect, and are sealed. Discharge gas containing xenon with a partial pressure of 5%, for example, is filled into a discharge space in the sealed product. Discharge cells are disposed in intersecting parts of the display electrode pairs and the data electrodes. In the panel having this structure, ultraviolet rays are emitted by gas discharge in each discharge cell. The ultraviolet rays excite respective phosphors of red (R), green (G), and blue (B) to emit light, and thus provide color display.

A subfield method is generally used as a method of driving the panel. In this method, one field period is divided into a plurality of subfields, and the subfields at which light is emitted are combined, thereby performing gradation display.

Each subfield has a setup period, an address period, and a sustain period. In the setup period, initializing discharge is performed to form a wall charge required for a subsequent addressing voltage on each electrode. The initializing operation includes an initializing operation (hereinafter referred to as "all-cell initializing operation") of causing initializing discharge in all discharge cells, and an initializing operation (hereinafter referred to as "selection initializing operation") of causing initializing discharge in a discharge cell having performed sustaining discharge.

In the address period, address pulse voltage is selectively applied to a discharge cell where display is to be performed, and addressing discharge is caused to form a wall charge (this operation is hereinafter referred to as "writing"). In the sustain period, sustain pulses are alternately applied to the display electrode pairs formed of the scan electrodes and the sustain electrodes, sustaining discharge is caused in the discharge cell having performed addressing discharge, and a phosphor layer of the corresponding discharge cell is light-emitted, thereby displaying an image.

Of the subfield method, a new driving method is disclosed. In this driving method, the initializing discharge is performed using a gently varying voltage waveform, and the initializing discharge is selectively applied to the discharge cell having performed sustaining discharge. Thus, light emission that is not related to the gradation display is minimized, and the contrast ratio is improved.

Specifically, in the setup period of one of a plurality of subfields, the all-cell initializing operation of causing discharge from all discharge cells is performed. In the setup period of another subfield, the selection initializing operation of initializing only the discharge cell having performed sustaining discharge is performed. As a result, light emission that is not related to the display is only the light emission accompanying the discharge of the all-cell initializing operation, and an image having sharp contrast can be displayed (e.g. patent document 1).

This driving manner allows image display of sharp contrast. That is because the luminance (hereinafter referred to as "black luminance") in a black display region varying in response to the light emission that is not related to the image display is determined only by weak light emission in the all-cell initializing operation.

The definition and screen size of the panel have been recently increased, and hence the quality of display images has been required to be further improved.

Sharpening the contrast is one of the effective methods for improving the image quality. For instance, an attempt is made to further sharpen the contrast by reducing the light emitting luminance during the initializing discharge by reducing maximum voltage in the all-cell initializing operation.

When the maximum voltage in the all-cell initializing operation is reduced, however, priming generated during initialization decreases to cause strong discharge in the initializing operation in the next field, sustaining discharge occurs though writing has not been performed, and a discharge cell (hereinafter referred to as "initializing bright point") that emits light can be generated disadvantageously. Therefore, the maximum voltage in all-cell initializing operation cannot be sufficiently reduced.

[Patent document 1] Japanese Patent Unexamined Publication No. 2000-242224

SUMMARY OF THE INVENTION

The plasma display device of the present invention has the following elements:
- a panel having a plurality of discharge cells including a data electrode and a display electrode pair that is formed of a scan electrode and a sustain electrode;
- a scan electrode driving circuit; and
- a data electrode driving circuit for driving the data electrodes.

In the scan electrode driving circuit, one field period includes a plurality of subfields having the following periods:
- a setup period for causing initializing discharge in the discharge cells;
- an address period for selectively causing addressing discharge in the discharge cells; and
- a sustain period for causing sustaining discharge in the discharge cells selected in the address period.

In the scan electrode driving circuit, one field period includes at least one subfield for applying ramp waveform voltage increasing in the setup period to the scan electrodes. The scan electrode driving circuit can vary the maximum voltage of the ramp waveform voltage. The scan electrode driving circuit generates ramp waveform voltage whose maximum voltage is smaller when a predetermined image establishing a previously determined condition is displayed than when an image other than the predetermined image is displayed. The data electrode driving circuit applies a positive voltage to the data electrodes while the ramp waveform voltage having the smaller maximum voltage is applied to the scan electrodes.

Thus, in displaying the predetermined image, occurrence of the initializing bright point can be suppressed to reduce the maximum voltage in an all-cell initializing operation, light emission in the all-cell initializing operation is suppressed to reduce the black luminance, and the contrast can be sharpened.

Figure 1:
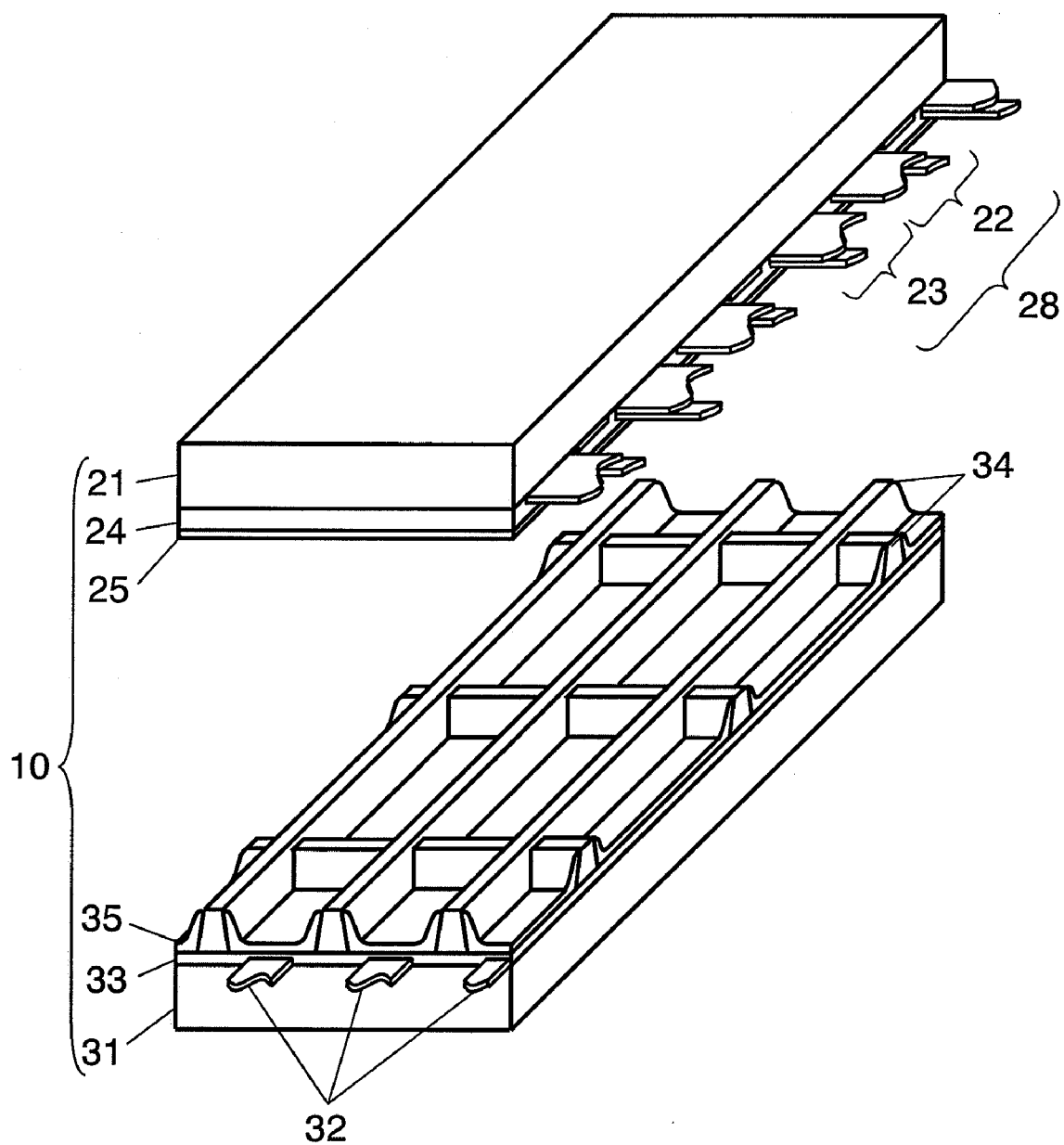
FIG. 1 is an exploded perspective view showing a structure of a panel in accordance with an exemplary embodiment of the present invention.

REFERENCE MARKS IN THE DRAWINGS 1 plasma display device
10 panel
21 front plate (made of glass)
22 scan electrode
23 sustain electrode
24, 33 dielectric layer
25 protective layer
28 display electrode pair
31 back plate
32 data electrode
34 barrier rib
35 phosphor layer
51 image signal processing circuit
52 data electrode driving circuit
53 scan electrode driving circuit
54 sustain electrode driving circuit
55 timing generating circuit
100 sustain pulse generating circuit
110 electric power recovering circuit
300 setup waveform generating circuit
400 scan pulse generating circuit
Q111, Q112, Q121, Q122, Q311, Q312, Q321, Q322, Q401, QH1-QHn, QL1-QLn, Q1D1-Q1Dm, Q2D1-Q2Dm switching element
C110, C150, C310, C320 capacitor
R310, R320 resistor
INa, INb, IN1-INm input terminal
D101, D102, D401 diode

DETAILED DESCRIPTION OF PREFERRED EMBODIMENTS

A plasma display device in accordance with an exemplary embodiment of the present invention will be described hereinafter with reference to the accompanying drawings.

Exemplary Embodiment

FIG. 1 is an exploded perspective view showing a structure of panel 10 in accordance with the exemplary embodiment of the present invention. A plurality of display electrode pairs 28 formed of scan electrodes 22 and sustain electrodes 23 are disposed on glass-made front plate 21. Dielectric layer 24 is formed so as to cover scan electrodes 22 and sustain electrodes 23, and protective layer 25 is formed on dielectric layer 24.

Protective layer 25 is actually used as a material of the panel in order to reduce the discharge start voltage in a discharge cell. Protective layer 25 is made of material that is mainly made of MgO and has a large secondary electron discharge coefficient and high durability when neon (Ne) and xenon (Xe) gases are filled.

A plurality of data electrodes 32 are formed on back plate 31, dielectric layer 33 is formed so as to cover data electrodes 32, and curb-like barrier ribs 34 are formed on dielectric layer 33. Phosphor layers 35 for emitting lights of respective colors of red (R), green (G), and blue (B) are formed on the side surfaces of barrier ribs 34 and on dielectric layer 33.

Front plate 21 and back plate 31 are faced to each other so that display electrode pairs 28 cross data electrodes 32 with a micro discharge space sandwiched between them, and the outer peripheries of them are sealed by a sealing material such as glass frit. The discharge space is filled with mixed gas of neon and xenon, for example, as discharge gas. The discharge space is partitioned into a plurality of sections by barrier ribs 34. Discharge cells are formed in the intersecting parts of display electrode pairs 28 and data electrodes 32. The discharge cells discharge and emit light to display an image.

The structure of the panel is not limited to the above-mentioned one, but may be a structure having striped barrier ribs, for example.

Figure 2:
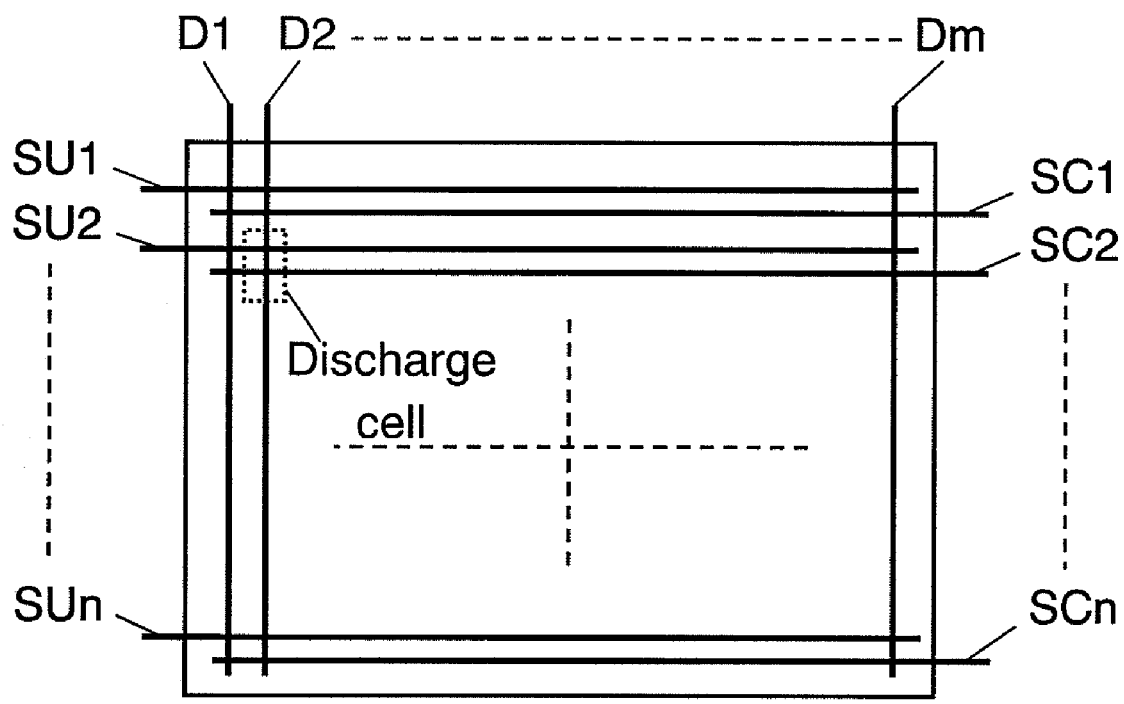
FIG. 2 is an electrode array diagram of the panel.

FIG. 2 is an electrode array diagram of panel 10 in accordance with the exemplary embodiment of the present invention. In panel 10, n scan electrodes SC1 through SCn (scan electrodes 22 in FIG. 1) and n sustain electrodes SU1 through SUn (sustain electrodes 23 in FIG. 1) long in the column direction are arranged, and m data electrodes D1 through Dm (data electrodes 32 in FIG. 1) long in the row direction are arranged. Each discharge cell is formed in the intersecting part of a pair of scan electrode SCi (i=1 through n) and sustain electrode SUi and one data electrode Dj (j=1 through m), the number of formed discharge cells in the discharge space is m×n. Since scan electrode SCi and sustain electrode SUi are formed in a pair in parallel as shown in FIG. 1 and FIG. 2, large inter-electrode large capacity Cp exists between scan electrodes SC1 through SCn and sustain electrodes SU1 through SUn.

Next, a driving voltage waveform and its operation for driving panel 10 are described. The plasma display device of the present embodiment performs gradation display by a sub-field method. In this method, one field period is divided into a plurality of subfields, and emission and non-emission of light of each display cell are controlled every subfield. Each subfield has a setup period, an address period, and a sustain period.

In the setup period, initializing discharge is performed to form a wall charge required for a subsequent addressing discharge on each electrode. The initializing operation has a function of reducing the discharge delay and generating a priming (detonating agent=excitation particle for discharge) for stably causing the addressing discharge. The initializing operation at this time includes an all-cell initializing operation of causing initializing discharge in all discharge cells, and a selection initializing operation of causing initializing discharge in a discharge cell that has performed sustaining discharge in the previous subfield.

In the address period, addressing discharge is selectively caused in a discharge cell to emit light in a subsequent sustain period, thereby forming a wall charge. In the sustain period, as many sustain pulses as the number proportional to luminance weight are alternately applied to display electrode pairs 28, sustaining discharge is caused in the discharge cell having caused addressing discharge, thereby emitting light. The proportionality constant is called "luminance magnification".

Figure 3:
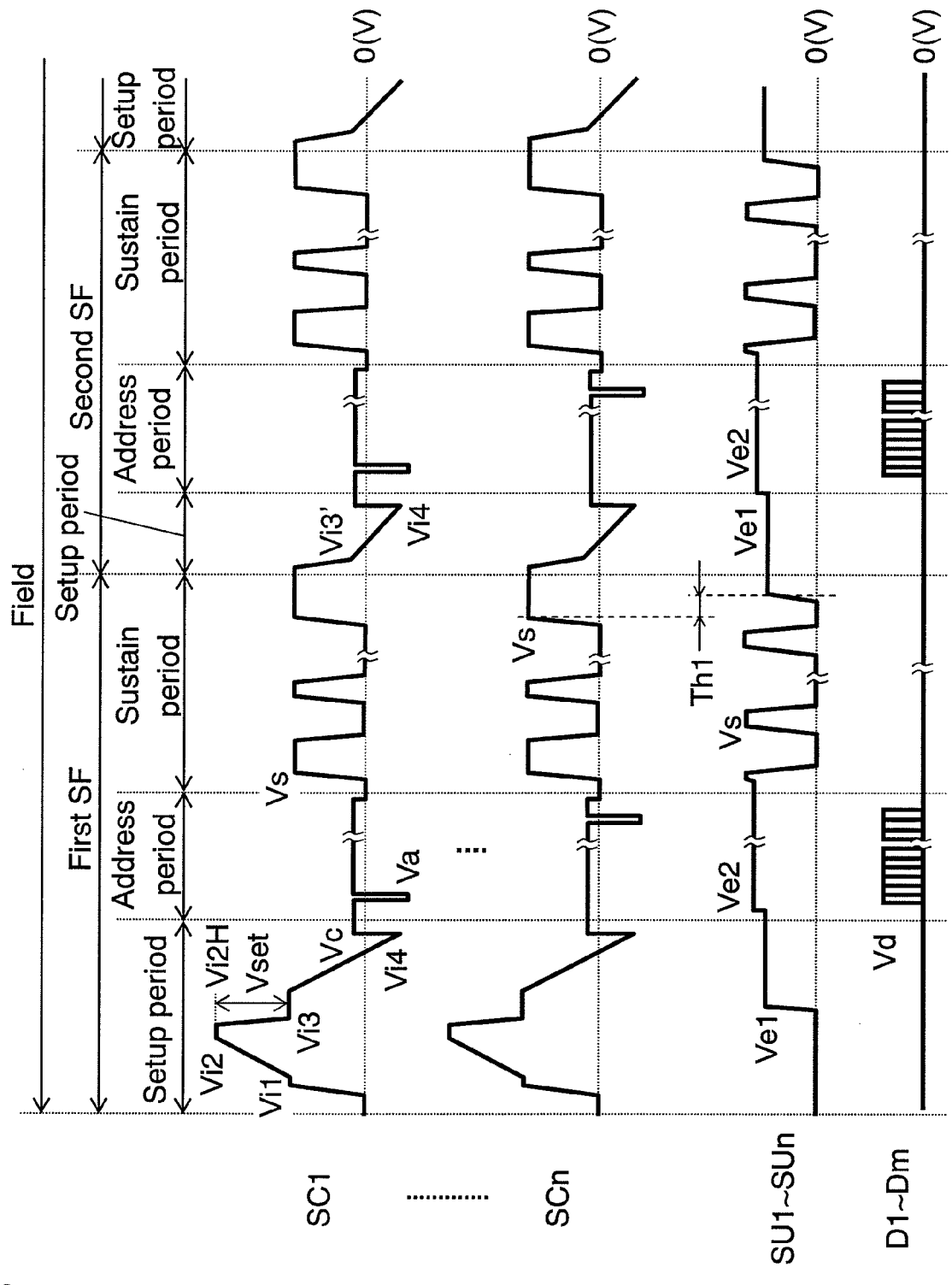
FIG. 3 is a waveform chart of driving voltage applied to each electrode of the panel when a normal image is displayed in accordance with the exemplary embodiment.

FIG. 3 is a waveform chart of driving voltage applied to each electrode of panel 10 when a normal image is displayed in accordance with the exemplary embodiment of the present invention. FIG. 3 shows driving voltage waveforms of two subfields, namely a subfield (hereinafter referred to as "all-cell initializing subfield") for performing an all-cell initializing operation, and a subfield (hereinafter referred to as "selection initializing subfield") for performing a selection initializing operation. However, a driving voltage waveform in another subfield is substantially similar to them. FIG. 3 shows driving voltage waveforms when an image other than a predetermined image described later (image other than the predetermined image is referred to as "normal image") is displayed First, a first SF as the all-cell initializing subfield is described.

In the first half of the setup period of the first SF, 0 (V) is applied to data electrodes D1 through Dm and sustain electrodes SU1 through SUn, and a ramp waveform voltage (hereinafter referred to as "up-ramp waveform voltage") is applied to scan electrodes SC1 through SCn. Here, the ramp waveform voltage gradually increases from voltage Vi1 that is not higher than a discharge start voltage to sustain electrodes SU1 through SUn to a voltage Vi2 that is higher than the discharge start voltage. Hereinafter, the maximum of the up-ramp waveform voltage applied to scan electrodes SC1 through SCn is referred to as "setup voltage Vi2". The difference between setup voltage Vi2 and voltage Vi1 is referred to as "Vset".

While the up-ramp waveform voltage increases, feeble initializing discharge occurs between scan electrodes SC1 through SCn and sustain electrodes SU1 through SUn, and feeble initializing discharge occurs between scan electrodes SC1 through SCn and data electrodes D1 through Dm. Negative wall voltage is accumulated on scan electrodes SC1 through SCn, and positive wall voltage is accumulated on data electrodes D1 through Dm and sustain electrodes SU1 through SUn. Here, the wall voltage on the electrodes means the voltage generated by the wall charges accumulated on the dielectric layer covering the electrodes, the protective layer, and the phosphor layer.

In the last half of the setup period, positive voltage Ve1 is applied to sustain electrodes SU1 through SUn. A ramp waveform voltage (hereinafter referred to as "down-ramp waveform voltage") is applied to scan electrodes SC1 through SCn. Here, the ramp waveform voltage gradually decreases from voltage Vi3 that is not higher than the discharge start voltage to sustain electrodes SU1 through SUn to voltage Vi4 that is higher than the discharge start voltage. While the ramp waveform voltage decreases, feeble initializing discharge occurs between scan electrodes SC1 through SCn and sustain electrodes SU1 through SUn, and feeble initializing discharge occurs between scan electrodes SC1 through SCn and data electrodes D1 through Dm. The negative wall voltage on scan electrodes SC1 through SCn and the positive wall voltage on sustain electrodes SU1 through SUn are reduced, positive wall voltage on data electrodes D1 through Dm is adjusted to a value suitable for the addressing voltage. Thus, the all-cell initializing operation of applying initializing discharge to all discharge cells is completed.

In the present embodiment, setup voltage Vi2 is switched between two different voltage values to drive panel 10. The higher voltage value is denoted with Vi2H, and the lower voltage value is denoted with Vi2L. When a normal image is displayed as shown in FIG. 3, setup voltage Vi2 is set at higher voltage value Vi2H.

In the subsequent address period, voltage Ve2 is applied to sustain electrodes SU1 through SUn, and voltage Vc is applied to scan electrodes SC1 through SCn.

First, negative scan pulse voltage Va is applied to scan electrode SC1 in the first column, positive address pulse voltage Vd is applied to data electrode Dk (k is integer 1 through m), of data electrodes D1 through Dm, in the discharge cell to emit light in the first column. The voltage difference in the intersecting part of data electrode Dk and scan electrode SC1 is derived by adding the difference between the wall voltage on data electrode Dk and that on scan electrode SC1 to the difference (Vd−Va) of the external applied voltage, and exceeds the discharge start voltage. Addressing discharge occurs between data electrode Dk and scan electrode SC1 and between sustain electrode SU1 and scan electrode SC1. Positive wall voltage is accumulated on scan electrode SC1, negative wall voltage is accumulated on sustain electrode SU1, and negative wall voltage is also accumulated on data electrode Dk.

Thus, an addressing voltage of causing addressing discharge in the discharge cell to emit light in the first column and accumulating wall voltage on each electrode is performed. The voltage in the intersecting parts of scan electrode SC1 and data electrodes D1 through Dm to which address pulse voltage Vd is not applied does not exceed the discharge start voltage, so that addressing discharge does not occur. This addressing voltage is repeated until it reaches the discharge cell in the n-th column, and the addressing voltage is completed.

In the subsequent sustain period, positive sustain pulse voltage Vs is firstly applied to scan electrodes SC1 through SCn, and 0 (V) is applied to sustain electrodes SU1 through SUn. In the discharge cell having caused the addressing discharge in the previous address period, the voltage difference between scan electrode SCi and sustain electrode SUi is obtained by adding the difference between the wall voltage on scan electrode SCi and that on sustain electrode SUi to sustain pulse voltage Vs, and exceeds the discharge start voltage.

Sustaining discharge occurs between scan electrode SCi and sustain electrode SUi, and ultraviolet rays generated at this time causes phosphor layer 35 to emit light. Negative wall voltage is accumulated on scan electrode SCi, positive wall voltage is accumulated on sustain electrode SUi. Positive wall voltage is also accumulated on data electrode Dk. In the discharge cell where addressing discharge has not occurred in the address period, sustaining discharge does not occur and the wall voltage at the completion of the setup period is kept.

Subsequently, 0 (V) is applied to scan electrodes SC1 through SCn, and sustain pulse voltage Vs is applied to sustain electrodes SU1 through SUn. In the discharge cell having caused the sustaining discharge, the voltage difference between sustain electrode SUi and scan electrode SCi exceeds the discharge start voltage. Therefore, sustaining discharge occurs between sustain electrode SUi and scan electrode SCi again, negative wall voltage is accumulated on sustain electrode SUi, and positive wall voltage is accumulated on scan electrode SCi. Hereinafter, similarly, as many sustain pulses as the number derived by multiplying the luminance weight by luminance magnification are alternately applied to scan electrodes SC1 through SCn and sustain electrodes SU1 through SUn to cause potential difference between the electrodes of the display electrode pairs, thereby continuing sustaining discharge in the discharge cell that has caused the addressing discharge in the address period.

At the end of the sustain period, voltage Ve1 is applied to sustain electrodes SU1 through SUn after predetermined time Th1 after voltage Vs is applied to scan electrodes SC1 through SCn, thereby causing so called narrow pulse-like voltage difference between scan electrodes SC1 through SCn and sustain electrodes SU1 through SUn. Thus, in the state where positive wall voltage is left on data electrode Dk, a part or the whole of wall voltage on scan electrode SCi and sustain electrode SUi is eliminated. Specifically, sustain electrodes SU1 through SUn are temporarily returned to 0 (V), then sustain pulse voltage Vs is applied to scan electrodes SC1 through SCn. Then, sustaining discharge occurs between sustain electrode SUi and scan electrode SCi in the discharge cell having caused the sustaining discharge. Before this discharge converges, namely while charged particles generated by the discharge sufficiently remain in the discharge space, voltage Ve1 is applied to sustain electrodes SU1 through SUn. This operation reduces the voltage difference between sustain electrode SUi and scan electrode SCi to the extent of (Vs−Ve1). Then, while the positive wall charge on data electrode Dk is left, the wall voltage between scan electrodes SC1 through SCn and sustain electrodes SU1 through SUn is reduced to the extent of difference (Vs−Ve1) between the voltages applied to respective electrodes. This discharge is hereinafter referred to as "erasing discharge".

After a predetermined time interval after applying voltage Vs for generating the last sustaining discharge, namely erasing discharge, to scan electrodes SC1 through SCn, voltage Ve1 for reducing the potential difference between the electrodes of the display electrode pair is applied to sustain electrodes SU1 through SUn. Thus, the sustaining operation in sustain period is completed.

Next, the operation of a second SF, namely the selection initializing subfield, is described hereinafter.

In the selection setup period of the second SF, while voltage Ve1 is applied to sustain electrodes SU1 through SUn and 0 (V) is applied to data electrodes D1 through Dm, a down-ramp waveform voltage gradually decreasing from voltage Vi3' to voltage V14 is applied to scan electrodes SC1 through SCn.

In the discharge cell that has caused the sustaining discharge in the sustain period of the last subfield, feeble initializing discharge occurs, and the wall voltage on scan electrode SCi and sustain electrode SUi is reduced. Regarding data electrode Dk, sufficient positive wall voltage is accumulated on data electrode Dk by the last sustaining discharge, so that the excessive part of the wall voltage is discharged to adjust the wall voltage to be appropriate for the addressing voltage.

While, in the discharge cell that has not caused the sustaining discharge in the last subfield, discharge is not performed and the wall charge at the completion of the setup period of the last subfield is kept. In the selection initializing operation, initializing discharge is selectively performed in the discharge cell where sustaining operation is performed in the sustain period of the last subfield.

The operation of the subsequent address period is similar to the operation of the address period of the all-cell initializing subfield, and hence is not described. The operation of the subsequent sustain period is similar except for the number of sustain pulses.

Next, a driving voltage waveform for driving panel 10 that is generated when a predetermined image establishing a previously determined condition is displayed, and its operation are described.

In the present embodiment, in a non-input state where no image signal is input, or when a dis-normal image signal such as an image signal with an extremely large S/N (signal-to-noise) ratio is input into the plasma display device, an entirely black mask image where all image levels of RGB are set at "0" is displayed so that an unsightly image is not displayed. This mask image is set as the predetermined image.

Figure 4:
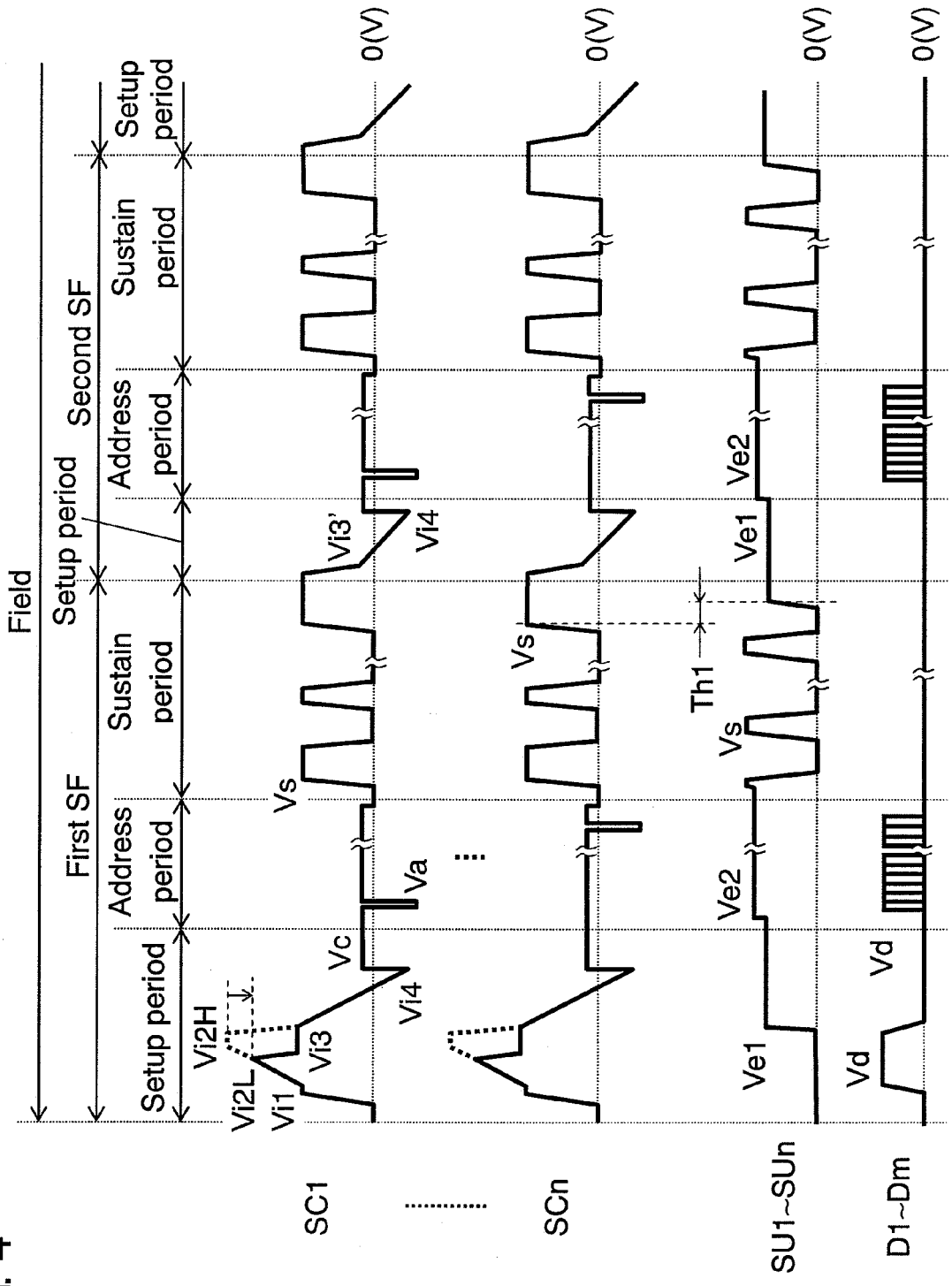
FIG. 4 is a waveform chart of driving voltage applied to each electrode of the panel when a predetermined image is displayed in accordance with the exemplary embodiment.

FIG. 4 is a waveform chart of driving voltage applied to each electrode of panel 10 when the predetermined image is displayed in accordance with the exemplary embodiment. The driving voltage waveform of FIG. 4 is different from the driving voltage waveform of FIG. 3 only in the waveform shape in the first half of the setup period of the all-cell initializing subfield. Except for this, the driving voltage waveform of FIG. 4 is similar to the driving voltage waveform of FIG. 3. Therefore, the driving voltage waveform in the first half of the setup period of the all-cell initializing subfield is described.

When the mask image is displayed on panel 10, the maximum voltage of the up-ramp waveform voltage applied to scan electrodes SC1 through SCn, namely setup voltage Vi2, is gradually decreased from higher voltage value Vi2H to lower voltage value Vi2L in the first half of the setup period of the first SF. During the decrease, 0 (V) is applied to data electrodes D1 through Dm and sustain electrodes SU1 through SUn.

While the up-ramp waveform voltage increases, initializing discharge occurs between scan electrodes SC1 through SCn and sustain electrodes SU1 through SUn, and initializing discharge occurs between scan electrodes SCi through SCn and data electrodes D1 through Dm. At this time, by decreasing setup voltage Vi2 to Vi2L, the duration of the up-ramp waveform voltage becomes shorter than when setup voltage Vi2 is varied to Vi2H, and the duration of the initializing discharge becomes short.

After setup voltage Vi2 reaches Vi2L and at least while the up-ramp waveform voltage is applied to scan electrodes SC1 through SCn, namely in the time period after the up-ramp waveform voltage is applied to scan electrodes SC1 through SCn and just before positive voltage Ve1 is applied to sustain electrodes SU1 through SUn in the present embodiment, positive voltage Vd is applied to data electrodes D1 through Dm. Details on these operations in the setup period are described later.

Figure 5:
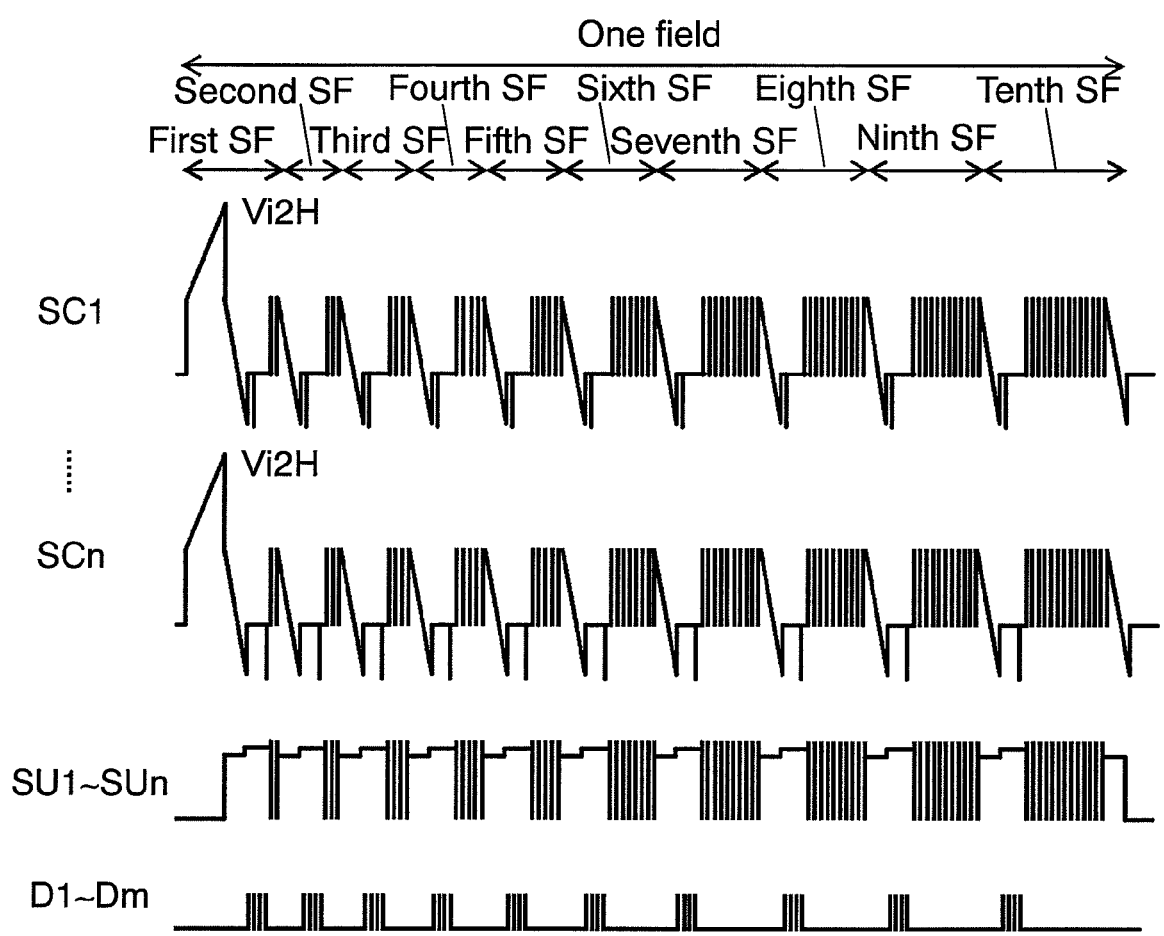
FIG. 5 is a schematic waveform chart showing a subfield structure based on the driving voltage waveform when the normal image is displayed in accordance with the exemplary embodiment.
Figure 6:
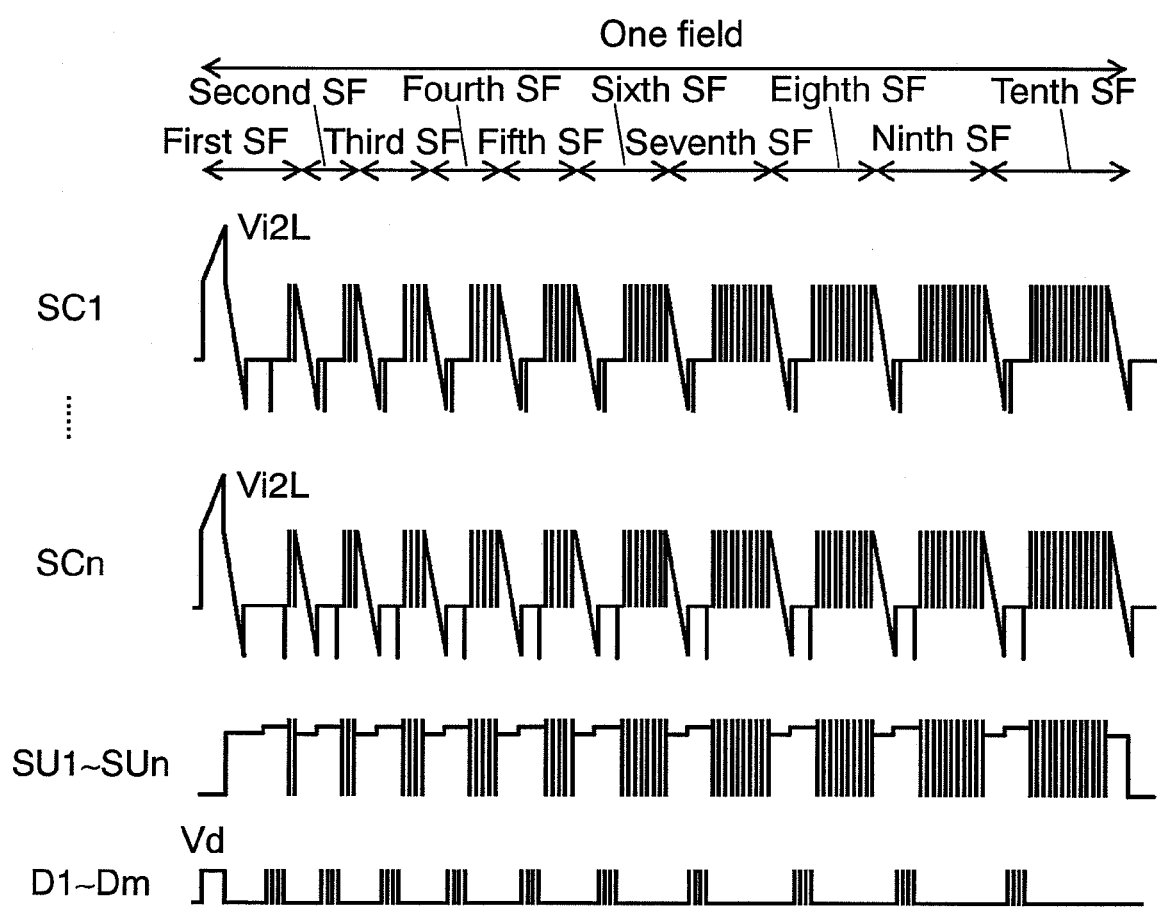
FIG. 6 is a schematic waveform chart showing a subfield structure based on the driving voltage waveform when the predetermined image is displayed in accordance with the exemplary embodiment.

Next, the subfield structures are described. FIG. 5 and FIG. 6 are schematic waveform charts showing subfield structures of the present embodiment of the present invention. FIG. 5 is a schematic waveform chart showing a subfield structure based on the driving voltage waveform when the normal image is displayed in the present embodiment. FIG. 6 is a schematic waveform chart showing a subfield structure based on the driving voltage waveform when the predetermined image is displayed in the present embodiment. FIG. 5 and FIG. 6 schematically show the driving voltage waveforms in one field in the subfield method. These driving voltage waveforms in respective subfields are equivalent to the driving voltage waveforms of FIG. 3 and FIG. 4.

In FIG. 5 and FIG. 6, one field is divided into 10 subfields (first SF, second SF, . . . , 10th SF), and respective subfields have subfield structures having luminance weights of 1, 2, 3, 6, 11, 18, 30, 44, 60 and 80, for example. In the present embodiment, the all-cell initializing operation is performed in the setup period of the first SF, and the selection initializing operation is performed in the setup period of each of the second SF through 10th SF. In the sustain period of each subfield, as many sustain pulses as the number derived by multiplying the luminance weight of each subfield by luminance magnification are applied to respective display electrode pairs.

In FIG. 5, in displaying the normal image, the all-cell initializing operation is performed in the setup period of the first SF by applying, to scan electrodes SC1 through SCn, the up-ramp waveform voltage where the voltage value of setup voltage Vi2 is set at Vi2H. In FIG. 6, in displaying the predetermined image, the all-cell initializing operation is performed in the setup period of the first SF by applying, to scan electrodes SC1 through SCn, the up-ramp waveform voltage where the voltage value of setup voltage Vi2 is set at Vi2L and by applying positive voltage Vd to data electrodes D1 through Dm.

In the present embodiment, the number of subfields and the luminance weight of each subfield are not limited to the above-mentioned values, but the subfield structure may be changed in response to an image signal or the like.

In the setup period where the all-cell initializing operation is performed in the present embodiment, setup voltage Vi2 that is the maximum voltage of the up-ramp waveform voltage is switched between two different voltage values, namely higher voltage value Vi2H and lower voltage value Vi2L, and the up-ramp waveform voltage is generated.

In displaying the normal image, the all-cell initializing operation is performed with the up-ramp waveform voltage where the voltage value of setup voltage Vi2 is set at Vi2H.

In displaying the predetermined image establishing the previously determined condition, the all-cell initializing operation is performed with the up-ramp waveform voltage where the voltage value of setup voltage Vi2 is set at Vi2L. Additionally, in displaying the predetermined image, positive voltage Vd is applied to data electrodes D1 through Dm while the up-ramp waveform voltage where at least the voltage value of setup voltage Vi2 is set at Vi2L is applied to scan electrodes SC1 through SCn.

Thus, in displaying the predetermined image, the maximum voltage in the all-cell initializing operation is reduced to suppress the luminance of the light emitted in the all-cell initializing operation, the black luminance is reduced to sharpen the contrast, and positive voltage Vd is applied to data electrodes D1 through Dm to prevent occurrence of the initializing bright point. The reason is as follows.

While the up-ramp waveform voltage increases in the all-cell initializing operation, initializing discharge occurs between scan electrodes SC1 through SCn and sustain electrodes SU1 through SUn, and initializing discharge occurs between scan electrodes SC1 through SCn and data electrodes D1 through Dm. At this time, by decreasing setup voltage Vi2 to Vi2L, the duration of the up-ramp waveform voltage becomes shorter than when setup voltage Vi2 is increased to Vi2H, and the duration of the initializing discharge can be shortened. Thus, the luminance of the light emitted in the all-cell initializing operation can be reduced.

When setup voltage Vi2 decreases to reduce the duration of the initializing discharge in the all-cell initializing operation, there is a risk that sufficient wall charge is not formed on each electrode. In this case, there is a risk that a writing failure due to the shortage of wall charge in the subsequent wiring occurs to cause a discharge cell (non-lighting cell) that does not cause sustaining discharge though writing is performed.

However, even if a non-lighting cell exists in an image that does not cause light emission, the non-lighting cell is not recognized and does not become a problem. Rather than it, reducing the black luminance by suppressing the light emitting luminance during the initializing discharge can improve the contrast and achieve better quality.

In the present embodiment, when an entirely black image such as a mask image is set as the predetermined image, and the predetermined image is displayed, setup voltage Vi2 of the up-ramp waveform voltage in the all-cell initializing operation is decreased from Vi2H in displaying the normal image to Vi2L. Thus, the light emitting luminance in the all-cell initializing operation is reduced, and the contrast is improved.

When the duration of the up-ramp waveform voltage is reduced in the all-cell initializing operation, the amount of priming formed during initialization is also reduced. Therefore, a discharge cell occurs that must perform the all-cell initializing operation in the next field in a state of small amount of priming. Such a discharge cell forcedly performs discharge in the state of small amount of priming in the initializing operation, so that strong discharge occurs. In the discharge cell that performs the strong discharge during applying the up-ramp waveform voltage, similar strong discharge occurs during applying the down-ramp waveform voltage to cause a wall charge state similar to the state where writing is performed. In such a case, an initializing bright point occurs, namely a discharge cell occurs where sustaining discharge occurs though writing is not performed.

The initializing bright point hardly occurs when Vset (setup voltage Vi2−Vi1) is high, and easily occurs when Vset is low. In other words, when setup voltage Vi2 is decreased from Vi2H to Vi2L, namely Vset is decreased, in displaying the predetermined image, the initializing bright point easily occurs. Even a feeble initializing bright point is easily recognized in an entirely black image such as the mask image.

Vset required for preventing occurrence of an initializing bright point depends on the temperature of the panel. As the temperature of the panel is lower, higher Vset is required.

Figure 7:
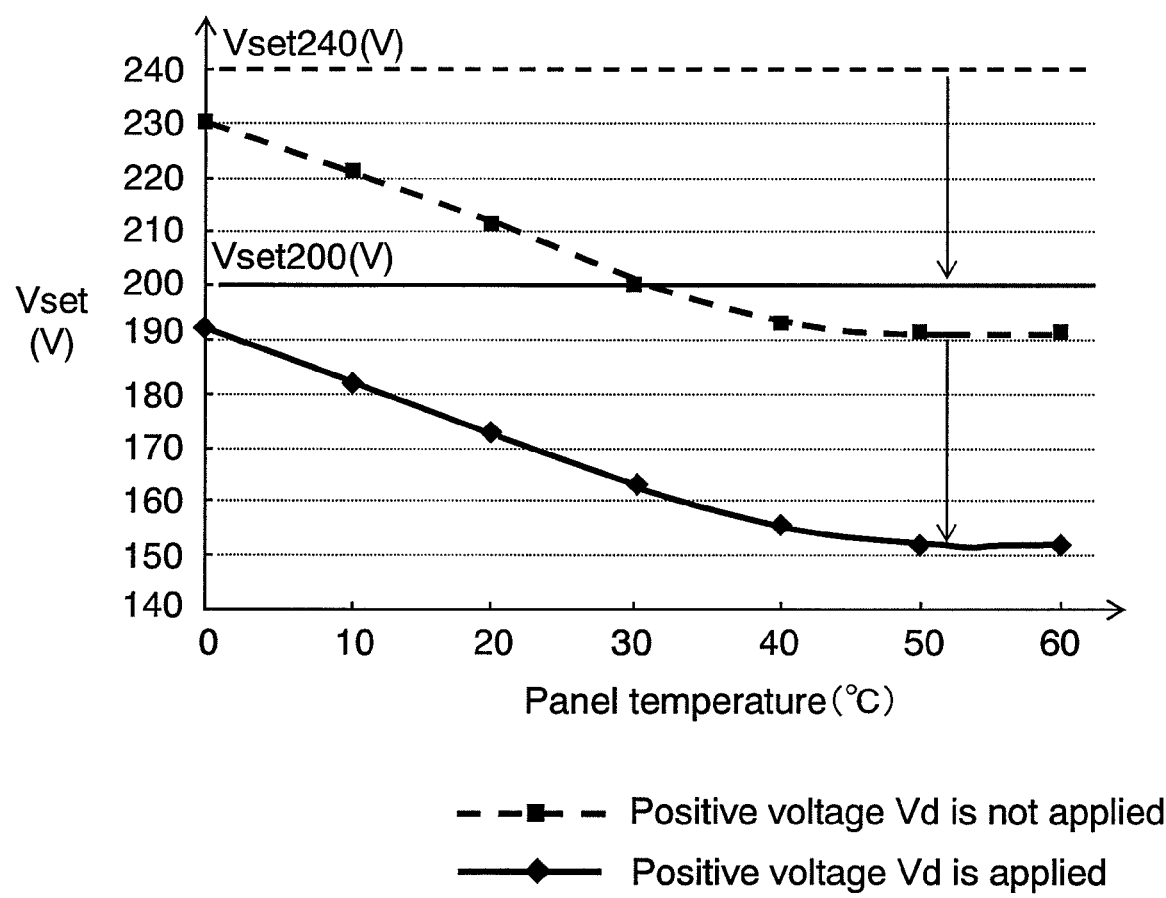
FIG. 7 shows a relationship between Vset required for preventing occurrence of a bright point and temperature of the panel in accordance with the exemplary embodiment.

FIG. 7 shows a relationship between Vset required for preventing occurrence of an initializing bright point and the temperature of the panel in accordance with the exemplary embodiment of the present invention. In FIG. 7, the vertical axis shows the Vset required for preventing occurrence of the initializing bright point, and the horizontal axis shows the temperature of the panel.

First, a case where positive voltage Vd is not applied to data electrodes D1 through Dm (broken line in FIG. 7) is described. The broken line in FIG. 7 shows that required Vset is about 190-193 (V) and does not so vary when the temperature of the panel is 40° C.-70° C. When the temperature of the panel is 40° C. or lower, however, required Vset gradually increases with decrease in temperature of the panel. When the temperature of the panel is 30° C., required Vset is about 200 (V). When the temperature of the panel is 0° C., required Vset is about 230 (V). When a normal image is displayed, Vi2H is set so that the Vset is about 240 (V), and the initializing bright point does not occur even when the temperature of the panel is 0° C.

When Vi2L is set so that the Vset is about 200 (V), for example, in order to reduce the light emitting luminance in the all-cell initializing operation, however, an initializing bright point occurs at the panel temperature of about 30° C. or lower. At this panel temperature, Vset required for preventing occurrence of the initializing bright point is about 200 (V) as shown in FIG. 7.

The initializing bright point occurs for the following reason.

As discussed above, the upper part of scan electrodes SC1 through SCn and sustain electrodes SU1 through SUn is covered with protective layer 25 made of material that is mainly made of MgO and has a large secondary electron discharge coefficient. The upper part of data electrodes D1 through Dm is covered with phosphor layer 35 whose secondary electron discharge coefficient is smaller than that of protective layer 25. Therefore, the initializing discharge can be stably generated by causing discharge between scan electrodes SC1 through SCn and sustain electrodes SU1 through SUn prior to the discharge between scan electrodes SC1 through SCn and data electrodes D1 through Dm. The driving voltage waveform where setup voltage Vi2 is set at Vi2H (in the present embodiment, Vset is set at 240 (V)) can cause stable initializing discharge.

In the driving voltage waveform where setup voltage Vi2 is set at Vi2L (in the present embodiment, Vset is set at 200 (V)), the potential difference between scan electrodes SC1 through SCn and sustain electrodes SU1 through SUn is smaller than that when setup voltage Vi2 is set at Vi2H. Therefore, there is a risk that discharge occurs between scan electrodes SC1 through SCn and data electrodes D1 through Dm before discharge occurs between scan electrodes SC1 through SCn and sustain electrodes SU1 through SUn. When the amount of the priming in the discharge cell is small, discharge forcedly occurs and strong discharge occurs. When the temperature of the panel decreases, this tendency is remarkable, and hence an initializing bright point easily occurs.

For preventing this problem, it is important that discharge is caused between scan electrodes SC1 through SCn and sustain electrodes SU1 through SUn before discharge is caused between scan electrodes SC1 through SCn and data electrodes D1 through Dm.

When positive voltage Vd is applied to data electrodes D1 through Dm, potential difference between scan electrodes SC1 through SCn and data electrodes D1 through Dm is reduced by a value corresponding to the applied positive voltage Vd. Therefore, discharge hardly occurs between scan electrodes SC1 through SCn and data electrodes D1 through Dm, and eventually discharge is apt to occur on ahead between scan electrodes SC1 through SCn and sustain electrodes SU1 through SUn. As shown by the solid line of FIG. 7, applying positive voltage Vd to data electrodes D1 through Dm can make Vset required for preventing occurrence of the initializing bright point lower by about 38 (V) than that in a case where positive voltage Vd is not applied. When the temperature of the panel is 0° C., required Vset can be set at about 192 (V).

In other words, even when setup voltage Vi2 is set at Vi2L (Vset is set at 200 (V)), applying positive voltage Vd to data electrodes D1 through Dm can prevent occurrence of the initializing bright point even when the temperature of the panel is ° C.

Thus, in the present embodiment, setup voltage Vi2 is set at Vi2L and positive voltage Vd is applied to data electrodes D1 through Dm when the predetermined image is displayed. Thus, in displaying the predetermined image, light emission in the all-cell initializing operation is suppressed to reduce the black luminance, and the contrast can be sharpened. The initializing bright point apt to occur when the maximum voltage in the all-cell initializing operation is decreased is prevented from occurring.

In the present embodiment, for changing setup voltage Vi2 from Vi2H to Vi2L, setup voltage Vi2 is not directly switched from Vi2H to Vi2L, but setup voltage Vi2 is gradually decreased from Vi2H to Vi2L. Therefore, the luminance does not rapidly change.

In the present embodiment, the time period until the setup voltage is changed from Vi2H to Vi2L is set at about 1 sec, positive voltage Vd is set at about 75 (V), Vset when the setup voltage is Vi2H is set at 240 (V), and Vset when the setup voltage is Vi2L is set at 200 (V). This is just an example set based on the panel characteristic of 1080 display electrode pairs and 50 inches, the present embodiment is not limited to these numerical values. Each of these numerical values is preferably set at an optimal value in response to the characteristics of the panel and the specification of the plasma display device.

Figure 8:
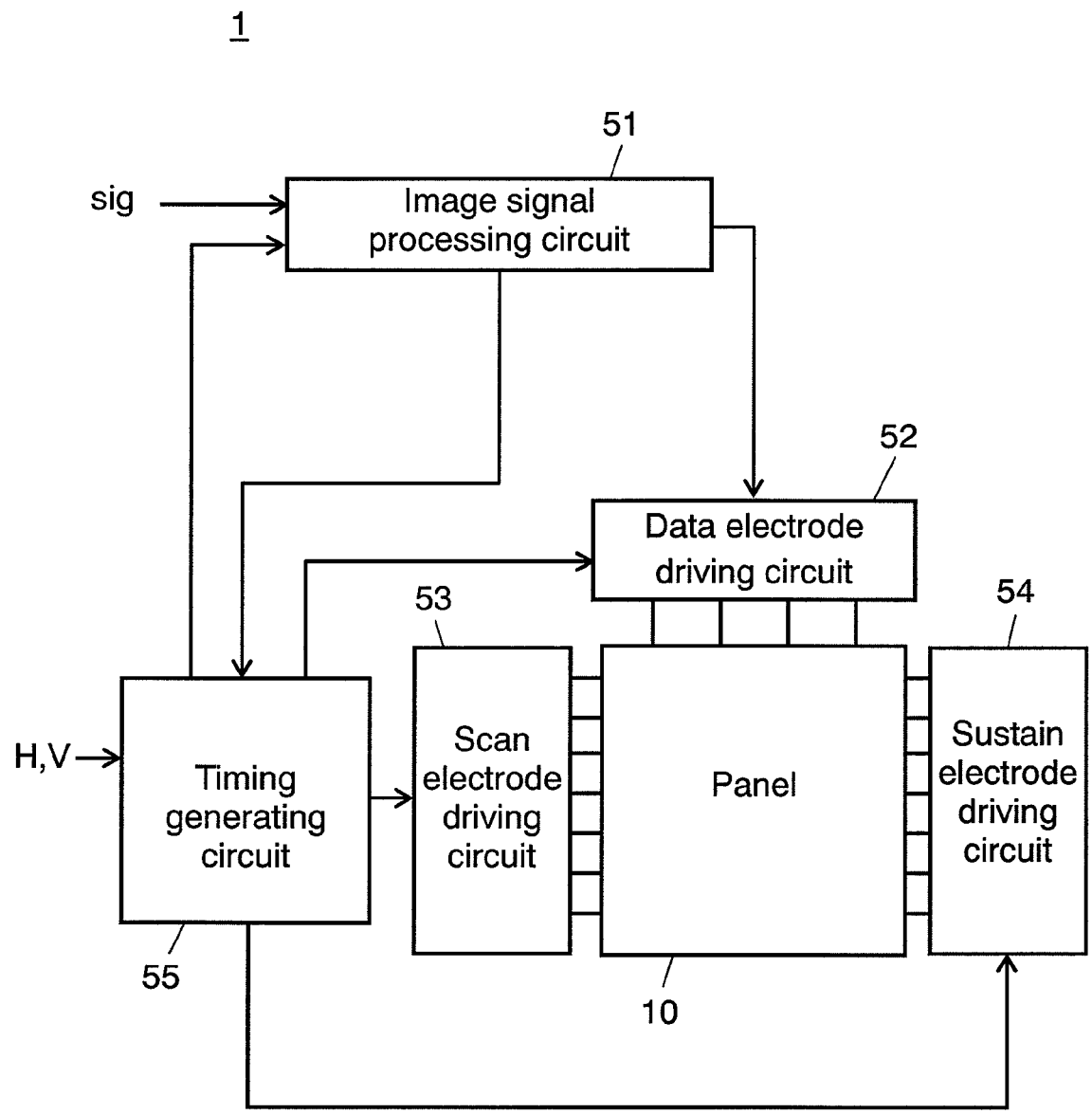
FIG. 8 is a circuit block diagram of a plasma display device in accordance with the exemplary embodiment.

Next, a structure of the plasma display device of the present embodiment is described. FIG. 8 is a circuit block diagram of the plasma display device of the present embodiment of the present invention. Plasma display device 1 has the following elements:

panel 10;
image signal processing circuit 51;
data electrode driving circuit 52;
scan electrode driving circuit 53;
sustain electrode driving circuit 54;
timing generating circuit 55; and
a power supply circuit (not shown) for supplying power required for each circuit block.

Image signal processing circuit 51 converts input image signal sig into image data that indicates emission or non-emission of light every subfield. In a non-input state where no image signal is input, or when a dis-normal image signal such as an image signal with an extremely large S/N ratio is input, image signal processing circuit 51 detects this fact and generates image data so that an entirely black mask image where all image levels of RGB are set at "0" is displayed on panel 10.

Timing generating circuit 55 generates various timing signals for controlling operation of each circuit block based on horizontal synchronizing signal H and vertical synchronizing signal V, and supplies them to respective circuit blocks. In the present embodiment, as discussed above, when the mask image as the predetermined image is displayed, timing generating circuit 55 performs control so that setup voltage Vi2 of the up-ramp waveform voltage that is to be applied to scan electrodes SC1 through SCn in the all-cell setup period is changed from higher voltage value Vi2H to lower voltage value Vi2L. Timing generating circuit 55 outputs a timing signal responsive to this control to scan electrode driving circuit 53. In the time period when the up-ramp waveform voltage where at least setup voltage Vi2 is changed to Vi2L is applied to scan electrodes SC1 through SCn, timing generating circuit 55 performs control so that positive voltage Vd is applied to data electrodes D1 through Dm, and outputs a timing signal responsive to this control to data electrode driving circuit 52. Thus, control for stabling the addressing voltage is performed.

Data electrode driving circuit 52 converts the image data every subfield into a signal corresponding to each of data electrodes D1 through Dm, and drives each of data electrodes D1 through Dm.

Scan electrode driving circuit 53 has a setup waveform generating circuit for generating a setup waveform to be applied to scan electrodes SC1 through SCn in the setup period, and drives each of scan electrodes SC1 through SCn based on a timing signal. Sustain electrode driving circuit 54 drives sustain electrodes SU1 through SUn based on the timing signal.

Figure 9:
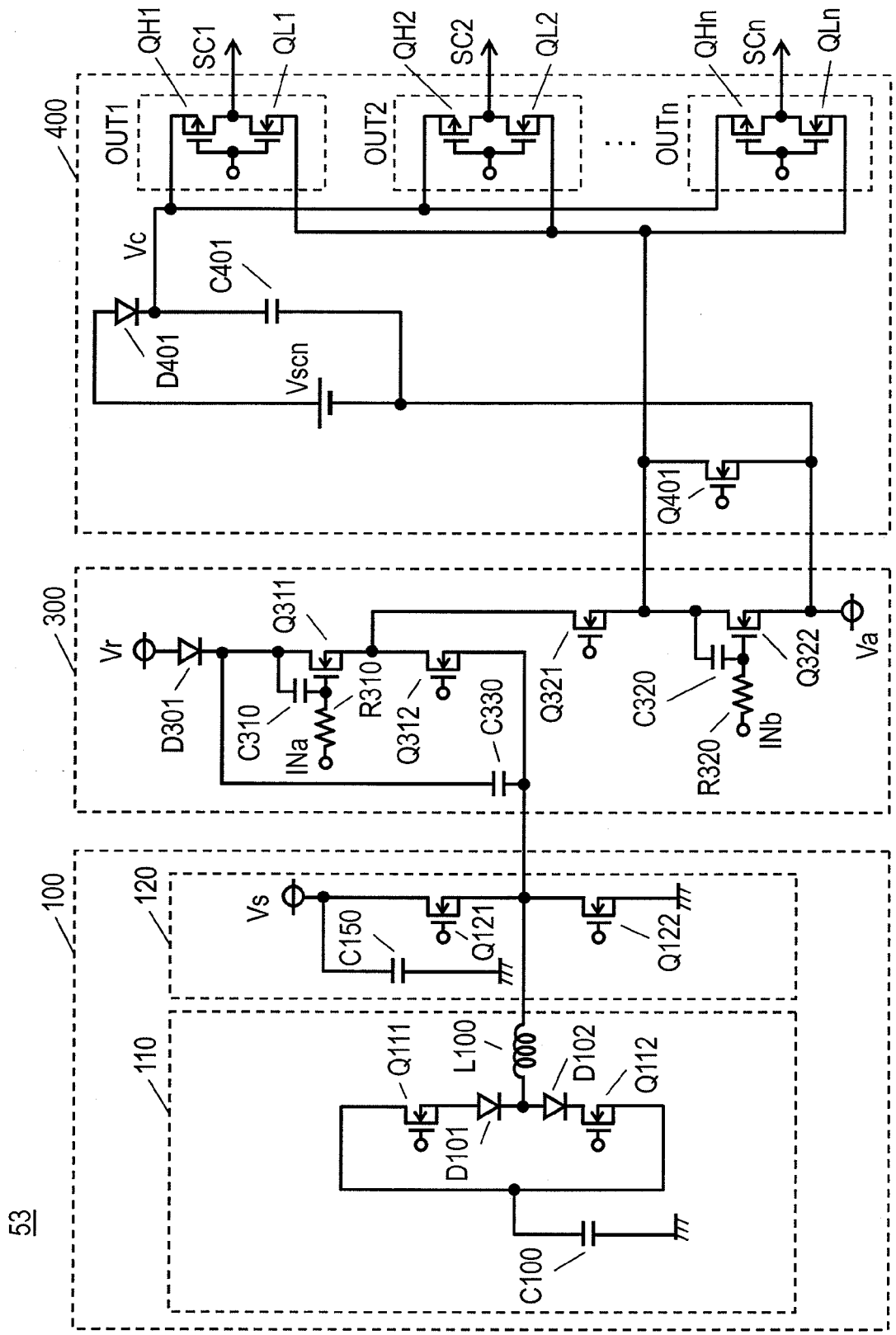
FIG. 9 is a circuit diagram of a scan electrode driving circuit in accordance with the exemplary embodiment.

Next, details on scan electrode driving circuit 53 and its operation are described. FIG. 9 is a circuit diagram of scan electrode driving circuit 53 in accordance with the exemplary embodiment of the present invention. Scan electrode driving circuit 53 has the following elements:

sustain pulse generating circuit 100 for generating a sustain pulse;

setup waveform generating circuit 300 for generating a setup waveform; and scan pulse generating circuit 400 for generating a scan pulse.

Sustain pulse generating circuit 100 has electric power recovering circuit 110 and clamping circuit 120. Electric power recovering circuit 110 has capacitor C100 for recovering electric power, switching element Q111, switching element Q112, diode D101 for preventing back flow, diode D102, and inductor L100 for resonance. Capacitor C100 for recovering electric power has a capacity sufficiently larger than inter-electrode capacity Cp, and is charged up to about Vs/2, namely a half of voltage value Vs discussed later, so as to work as the power supply of electric power recovering circuit 110. Clamping circuit 120 has switching element Q121 for clamping scan electrodes SC1 through SCn on voltage Vs, and switching element Q122 for clamping scan electrodes SC1 through SCn on 0 (V). Clamping circuit 120 also has smoothing capacitor C150 for reducing the impedance of voltage source Vs. Sustain pulse voltage Vs is generated based on the timing signal output from timing generating circuit 55.

Setup waveform generating circuit 300 has the following elements:

a Miller integrating circuit that has switching element Q311, capacitor C310, and resistor R310, and generates up-ramp waveform voltage gradually increasing like a ramp up to predetermined setup voltage Vi2;

a Miller integrating circuit that has switching element Q322, capacitor C320, and resistor R320, and generates down-ramp waveform voltage gradually decreasing like a ramp to voltage V14;

a separating circuit employing switching element Q312;

a separating circuit employing switching element Q321; and diode D301 for preventing back flow.

Setup waveform generating circuit 300 generates the above-mentioned setup waveform based on the timing signal output from timing generating circuit 55, and controls setup voltage Vi2 in the all-cell initializing operation. FIG. 9 shows respective input terminals of Miller integrating circuits as input terminal INa and input terminal INb.

Scan pulse generating circuit 400 has the following elements:

switching circuits OUT1 through OUTn for outputting scan pulse voltage to respective scan electrodes SC1 through SCn;

switching element Q401 for clamping the low voltage side of switching circuits OUT1 through OUTn on voltage Va; and diode D401 and capacitor C401 for applying voltage Vc obtained by superimposing voltage Vscn on voltage Va to the high voltage side of switching circuits OUT1 through OUTn.

Switching circuits OUT1 through OUTn have switching elements QH1 through QHn for outputting voltage Vc and switching elements QL1 through QLn for outputting voltage Va, respectively. Scan pulse generating circuit 400 sequentially generates scan pulse voltage Va to be applied to scan electrodes SC1 through SCn in the address period based on the timing signal output from timing generating circuit 55.

Extremely large current flows in switching element Q121, switching element Q122, switching element Q312, and switching element Q321, so that a plurality of field effect transistors (FETs) and insulated gate bipolar transistors (IGBTs) are connected to these switching elements in parallel to reduce the impedance.

In the present embodiment, setup waveform generating circuit 300 employs the Miller integrating circuits having a practical FET with a relatively simple structure. However, the setup waveform generating circuit is not limited to this structure, and may be any circuit as long as the circuit can generate up-ramp waveform voltage and down-ramp waveform voltage.

A sustain pulse generating circuit (not shown) of sustain electrode driving circuit 54 has a structure similar to sustain pulse generating circuit 100. The sustain pulse generating circuit has the following elements:

an electric power recovering circuit for recovering and recycling the electric power for driving sustain electrodes SU1 through SUn;

a switching element for clamping sustain electrodes SU1 through SUn on voltage Vs; and a switching element for clamping sustain electrodes SU1 through SUn on 0 (V).

The sustain pulse generating circuit generates sustain pulse voltage Vs based on the timing signal output from timing generating circuit 55.

Figure 10:
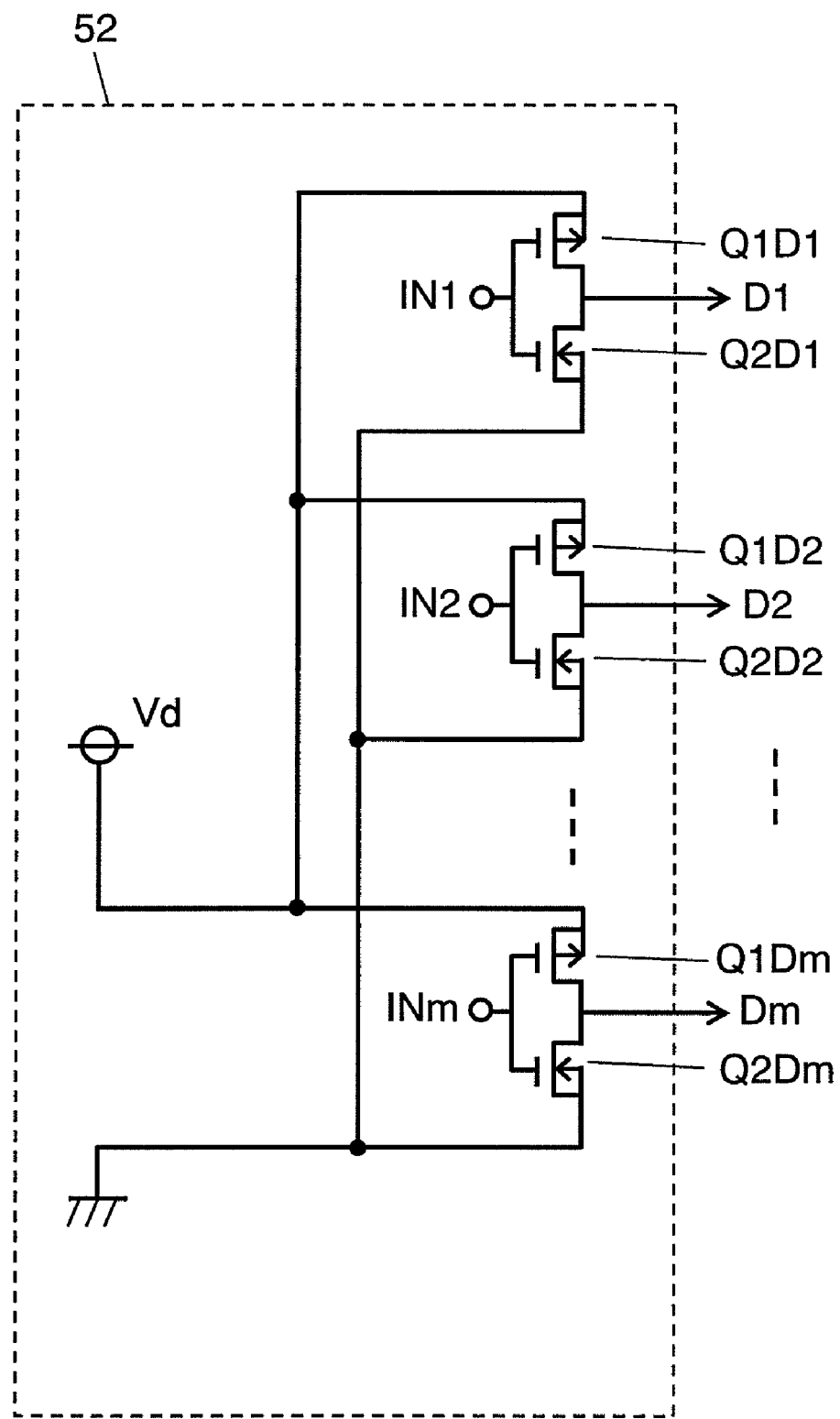
FIG. 10 is a circuit diagram of a data electrode driving circuit in accordance with the exemplary embodiment.

FIG. 10 is a circuit diagram of data electrode driving circuit 52 in accordance with the exemplary embodiment of the present invention. Data electrode driving circuit 52 has switching elements Q1D1 through Q1Dm and switching elements Q2D1 through Q2Dm. Data electrode driving circuit 52 independently clamps data electrodes D1 through Dm on voltage Vd via switching elements Q1D1 through Q1Dm, respectively. Data electrode driving circuit 52 independently grounds data electrodes D1 through Dm via switching elements Q1D1 through Q1Dm to clamp them on 0 (V), respectively. Thus, data electrode driving circuit 52 independently drives data electrodes D1 through Dm, and applies positive address pulse voltage Vd to data electrodes D1 through Dm based on the timing signal output from timing generating circuit 55. In FIG. 10, input terminals common to switching elements Q1D1 through Q1Dm and switching elements Q2D1 through Q2Dm are denoted with input terminals IN1 through INm, respectively.

Next, an operation of setup waveform generating circuit 300 and a control method of setup voltage Vi2 are described with reference to the following drawings. First, an operation for setting setup voltage Vi2 at Vi2H is described with reference to FIG. 11, and an operation for setting setup voltage Vi2 at Vi2L is described with reference to FIG. 12. Setup voltage Vi2 is controlled in the all-cell initializing operation, so that the control method is described taking the driving voltage waveform in the all-cell initializing operation as an example in FIG. 11 and FIG. 12.

Figure 11:
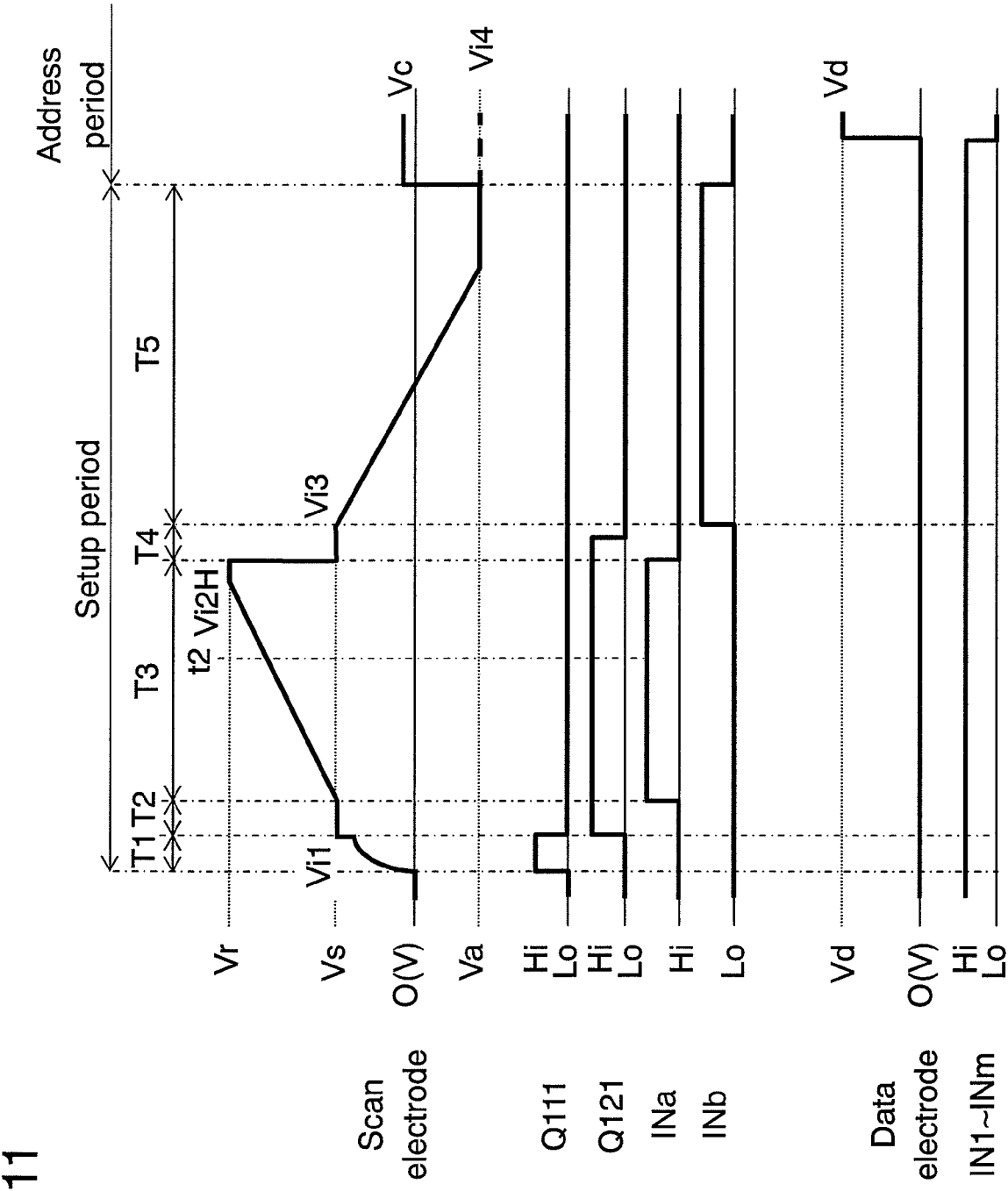
FIG. 11 is a timing chart illustrating an operation of the scan electrode driving circuit in an all-cell setup period when the normal image is displayed in accordance with the exemplary embodiment.
Figure 12:
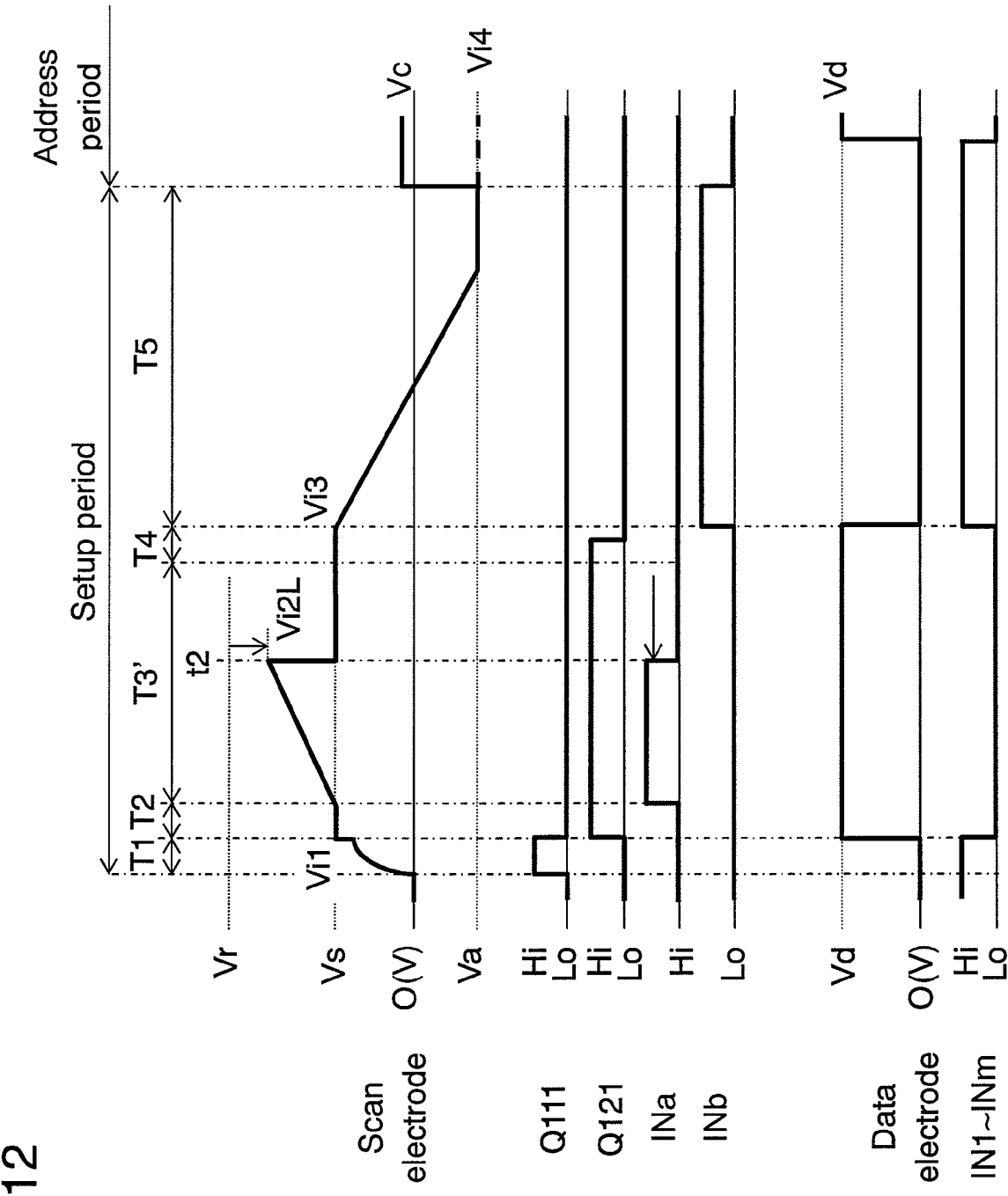
FIG. 12 is a timing chart illustrating an operation of the scan electrode driving circuit in an all-cell setup period when the predetermined image is displayed in accordance with the exemplary embodiment.

In FIG. 11 and FIG. 12, the driving voltage waveform for the all-cell initializing operation is divided into five time periods T1 through T5, and each time period is described. The description is performed assuming that voltage Vi1 and voltage Vi3 are equal to voltage Vs, voltage Vi2H is equal to voltage Vr, and voltage Vi4 is equal to negative voltage Va. The operation of conducting a switching element is denoted with ON, and the operation of breaking it is denoted with OFF in the following description. In FIG. 11 and FIG. 12, a signal for setting the switching element at ON is denoted with "Hi", and a signal for setting the switching element at OFF is denoted with "Lo".

FIG. 11 is a timing chart illustrating the operation of scan electrode driving circuit 53 in the all-cell setup period when the normal image is displayed in accordance with the exemplary embodiment of the present invention. Data electrodes D1 through Dm are kept at 0 (V) in the setup period, so that a signal for keeping switching elements Q1D1 through Q1Dm at OFF and keeping switching elements Q2D1 through Q2Dm at ON is fed into input terminals IN1 through INm in time periods T1 through T5. A voltage waveform of setup waveform generating circuit 300 is supplied from scan pulse generating circuit 400 as it is.

(Time Period T1)

Switching element Q111 of sustain pulse generating circuit 100 is firstly set at ON. At this time, inter-electrode large capacity Cp resonates with inductor L100, and the voltage of scan electrodes SC1 through SCn starts to increase from capacitor C100 for recovering electric power through switching element Q111, diode D101, and inductor L100.

(Time Period T2)

Next, Switching Element Q121 of Sustain Pulse Generating Circuit 100 is set at ON. Voltage Vs is then applied to scan electrodes SC1 through SCn via switching element Q121, and the potential of scan electrodes SC1 through SCn becomes voltage Vs (equal to voltage Vi1 in the present embodiment).

(Time Period T3)

Next, input terminal INa of the Miller integrating circuit for generating the up-ramp waveform voltage is set at "Hi". Specifically, voltage 15 (V), for example, is applied to input terminal INa. Constant current then flows from resistor R310 toward capacitor C310, the source voltage of switching element Q311 increases like a ramp, and the output voltage of scan electrode driving circuit 53 also starts to increase like a ramp. This voltage increase continues while input terminal INa is in "Hi".

After the output voltage increases to voltage Vr (equal to voltage Vi2H in the present embodiment), input terminal INa is set at "Lo". Specifically, voltage 0 (V), for example, is applied to input terminal INa.

Thus, up-ramp waveform voltage that gradually increases from voltage Vs that is not higher than the discharge start voltage to voltage Vr that is higher than the discharge start voltage is applied to scan electrodes SC1 through SCn. Here, voltage Vs is equal to voltage Vi1 and voltage Vr is equal to voltage Vi2H in the present embodiment.

(Time Period T4)

Input terminal INa is set at "Lo". The voltage of scan electrodes SC1 through SCn then decreases to voltage Vs (equal to voltage Vi3 in the present embodiment). After that, switching element Q121 is set at OFF.

(Time Period T5)

Next, input terminal INb of the Miller integrating circuit for generating the down-ramp waveform voltage is set at "Hi". Specifically, voltage 15 (V), for example, is applied to input terminal INb. Constant current then flows from resistor R320 toward capacitor C320, the drain voltage of switching element Q322 decreases like a ramp, and the output voltage of scan electrode driving circuit 53 also starts to decrease like a ramp. After the output voltage reaches negative voltage Vi4, input terminal INb is set at "Lo". Specifically, voltage 0 (V), for example, is applied to input terminal INb.

Thus, scan electrode driving circuit 53 applies, to scan electrodes SC1 through SCn, the up-ramp waveform voltage that gradually increases from voltage Vi1 that is not higher than the discharge start voltage to voltage Vi2 that is higher than the discharge start voltage, then applies the down-ramp waveform voltage that gradually decreases from voltage Vi3 toward voltage Vi4.

In the address period, a signal for setting switching elements Q1D1 through Q1Dm at ON and setting the switching elements Q2D1 through Q2Dm at OFF is fed into input terminals IN1 through INm with a timing responsive to the image signal, thereby generating address pulse voltage Vd.

Next, an operation for setting setup voltage Vi2 at Vi2L is described with reference to FIG. 12. FIG. 12 is a timing chart illustrating the operation of scan electrode driving circuit 53 in the all-cell setup period when the determined image is displayed in accordance with the exemplary embodiment of the present invention. In FIG. 12, the operations in time periods T1, T2, T4 and T5 are similar to those in time periods T1, T2, T4 and T5 of FIG. 11, so that the operation in time period T3' that is different from that in time period T3 of FIG. 11 is described.

(Time Period T3')

In time period T3', input terminal INa of the Miller integrating circuit for generating the up-ramp waveform voltage is set at "Hi". Constant current then flows from resistor R310 toward capacitor C310, the source voltage of switching element Q311 increases like a ramp, and the output voltage of scan electrode driving circuit 53 also starts to increase like a ramp. This voltage increase continues while input terminal INa is in "Hi".

In the present embodiment, duration when input terminal INa is in "Hi" is gradually shortened, thereby gradually decreasing the voltage value of setup voltage Vi2 from Vi2H. In the present embodiment, the time taken for changing setup voltage Vi2 from Vi2H to Vi2L is set at about 1 sec. In other words, taking about 1 sec, duration when input terminal INa is in "Hi" is gradually shortened toward time t2 at which the voltage value of setup voltage Vi2 reaches Vi2L.

After a lapse of about 1 sec, input terminal INa is switched from "Hi" to "Lo" at time t2, and the voltage value of setup voltage Vi2 is kept at Vi2L. In the present embodiment, Vi2H is set so that Vset is 240 (V), and Vi2L is set so that Vset is 200 (V). The above-mentioned time and voltage values are just a few examples, and are preferably set at optimal values in response to the characteristic of the panel and the specification or the like of the plasma display device.

Just after the voltage value of setup voltage Vi2 reaches Vi2L, a signal for keeping switching elements Q1D1 through Q1Dm at ON and keeping the switching elements Q2D1 through Q2Dm at OFF for time period T3' is applied to input terminals IN1 through INm. Thus, positive voltage Vd is applied to data electrodes D1 through Dm Thus, in the present embodiment, since scan electrode driving circuit 53 has the circuitry shown in FIG. 10, the maximum voltage of the gradually increasing up-ramp waveform voltage, namely the voltage value of setup voltage Vi2, can be easily controlled only by controlling the duration when input terminal INa of the Miller integrating circuit for generating the up-ramp waveform voltage is kept at "Hi".

Figure 13:
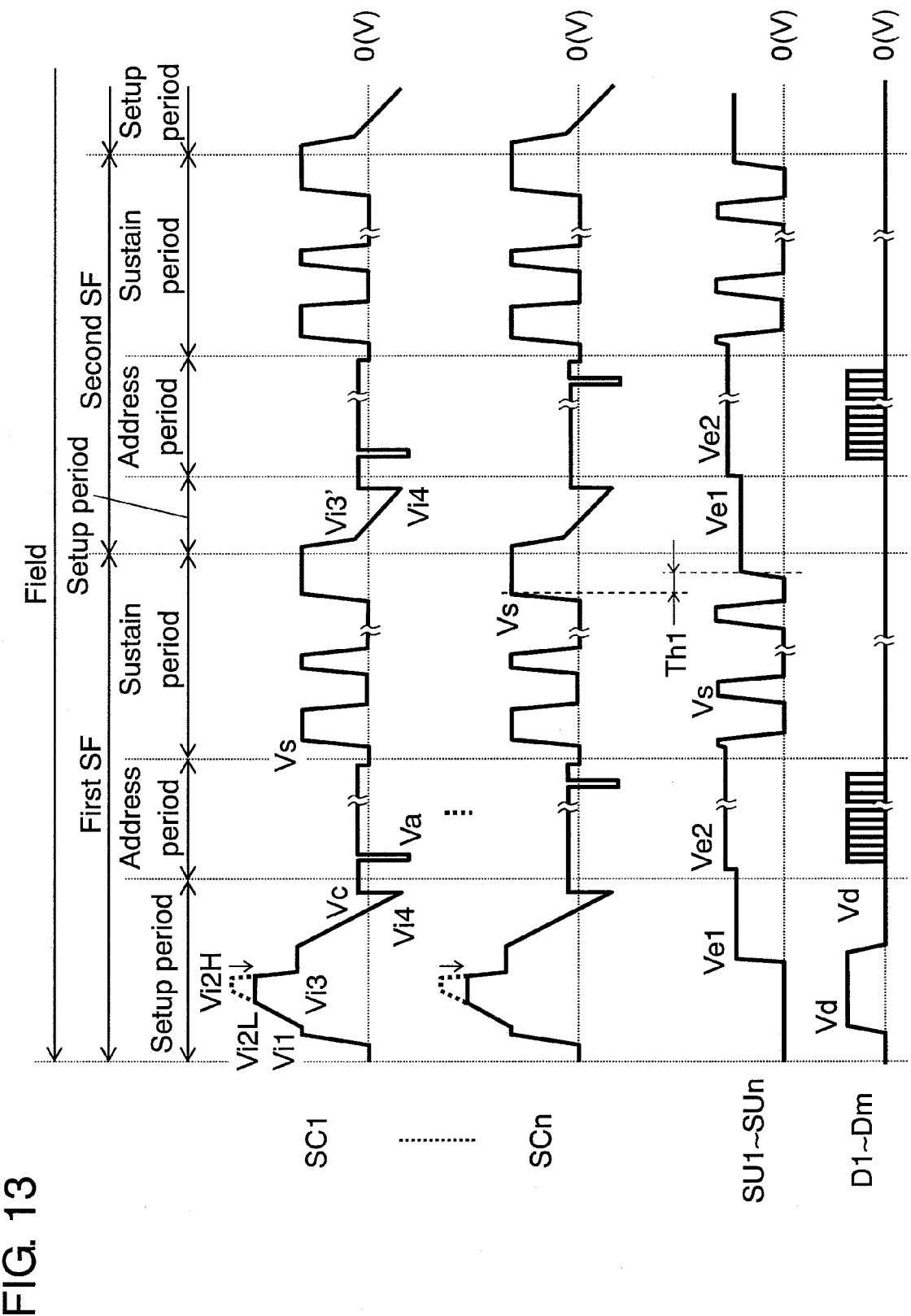
FIG. 13 is another waveform chart of driving voltage applied to each electrode of the panel when the predetermined image is displayed in accordance with the exemplary embodiment.

For changing setup voltage Vi2, various methods other than the above-mentioned method can be used. FIG. 13 is another waveform chart of driving voltage applied to each electrode of the panel when the predetermined image is displayed in accordance with the exemplary embodiment of the present invention. For instance, a structure may be used where a setup waveform generating circuit has a plurality of power supplies and the maximum voltage is changed by switching between the power supplies in generating the up-ramp waveform voltage. Alternatively, it is considered that setup voltage Vi2 is increased or decreased by controlling the gradient of the increase from voltage Vi1 to setup voltage Vi2. In the present embodiment, the method of changing setup voltage Vi2 is not limited to the above-mentioned methods, another method may be used.

In the present embodiment, as discussed above, when an entirely black predetermined image such as a mask image is displayed, setup voltage Vi2 as the maximum voltage of the up-ramp waveform voltage is decreased to Vi2L and positive voltage Vd is applied to data electrodes D1 through Dm. Thus, in displaying the predetermined image, light emission in the all-cell initializing operation is suppressed to reduce the black luminance, and the contrast can be sharpened. Additionally, the initializing bright point apt to occur when the maximum voltage in the all-cell initializing operation is decreased is prevented from occurring.

In the present embodiment, a mask image is assumed to be the predetermined image. However, this is just an example, and the predetermined image is not limited to the mask image. For instance, a structure may be used where a predetermined detecting circuit is disposed and an image that is detected by the detecting circuit and establishes a predetermined condition is detected as the predetermined image. For instance, a structure may be used where a lighting rate detecting circuit for detecting the lighting rate showing the ratio of the lighting cells to all discharge cells every subfield is disposed and the image is set as the predetermined image when the lighting rate is lower than a previously determined threshold (for example, 0.1%) in all subfields. Alternatively, a structure may be used where an average picture level (APL) detecting circuit for detecting the APL in one field period of an image signal is disposed and the image is set as the predetermined image when the APL is lower than a previously determined threshold (for example, 1%).

Even a structure where the luminance magnification is changed in response to the brightness of the display image can be applied in the present embodiment, and a similar advantage can be gained. In this case, for suppressing rapid change of the luminance, it is preferable that the change of setup voltage Vi2 is started after the luminance magnification is changed by switching the normal image to the predetermined image.

The partial pressure of xenon in discharge gas is set at 10% in the present embodiment; however, another partial pressure of xenon may be used as long as a driving voltage corresponding to the panel can be set.

Specific numerical values used in the present embodiment are just a few examples, and are preferably set at optimal values appropriately in response to the characteristic of the panel and the specification or the like of the plasma display device.

In the present embodiment, as discussed above, when an entirely black predetermined image is displayed, setup voltage Vi2 is set at Vi2L and positive voltage Vd is applied to data electrodes D1 through Dm. Thus, in displaying the predetermined image, light emission in the all-cell initializing operation is suppressed to reduce the black luminance, and the contrast can be sharpened. Additionally, the initializing bright point apt to occur when the maximum voltage in the all-cell initializing operation is decreased is prevented from occurring. In changing setup voltage Vi2 from Vi2H to Vi2L, setup voltage Vi2 is not directly switched from Vi2H to Vi2L, but setup voltage Vi2 is gradually decreased from Vi2H to Vi2L. Therefore, the luminance does not rapidly change.

INDUSTRIAL APPLICABILITY

A plasma display device and a panel driving method of the present invention can reduce the maximum voltage in an all-cell initializing operation while reducing occurrence of an initializing bright point, has sharp contrast, and has high image display quality.

The invention claimed is:

1. A plasma display device comprising:
a plasma display panel having a plurality of discharge cells, each of the plurality of discharge cells having (i) a display electrode pair including a scan electrode and a sustain electrode and (ii) a data electrode,
wherein one field period includes two types of subfield, one of the two types of subfield being an all-cell initializing subfield and the other one of the two types of subfield being a selection initializing subfield,
wherein the all-cell initializing subfield has:
   a setup period for causing initializing discharge in all of the plurality of discharge cells;
   an address period for selectively causing addressing discharge in the plurality of discharge cells; and
   a sustain period for causing sustaining discharge in a discharge cell selected in the address period,
wherein the selection initializing subfield has:
   a setup period for causing initializing discharge in the discharge cell where a sustaining operation is performed in the sustain period of the last subfield;
   an address period for selectively causing addressing discharge in the plurality of discharge cells; and
   a sustain period for causing sustaining discharge in a discharge cell selected in the address period,
wherein, in the setup period of the all-cell initializing subfield, an increasing ramp waveform voltage is applied to the scan electrodes,
wherein the plasma display device further comprises:
   a scan electrode driving circuit capable of varying a maximum voltage of the ramp waveform voltage; and
   a data electrode driving circuit capable of varying a voltage applied to the data electrodes while the ramp waveform voltage is applied to the scan electrodes,
wherein the scan electrode driving circuit generates the ramp waveform voltage so that the maximum voltage of the ramp waveform voltage is made smaller when a predetermined image establishing a previously determined condition is displayed than when a normal image other than the predetermined image is displayed, and
wherein the data electrode driving circuit, in the case when the predetermined image is displayed, applies a positive voltage, which is greater than a voltage applied to the data electrodes when the normal image is displayed, to the data electrodes while the ramp waveform voltage having the smaller maximum voltage is applied to the scan electrodes.

2. The plasma display device of claim 1,
wherein when a normal image signal is not input, a previously determined mask image is displayed and the mask image is set as the predetermined image.

3. The plasma display device of claim 1, further comprising a lighting rate detecting circuit for detecting a lighting rate of the plurality of discharge cells for every subfield,
wherein an image where the lighting rate is lower than a previously determined threshold in all of the subfields in one field period is set as the predetermined image.

4. The plasma display device of claim 1, further comprising an APL detecting circuit for detecting an average picture level of an image,
wherein an image where the average picture level is lower than a previously determined threshold is set as the predetermined image.

5. A driving method of a plasma display panel having a plurality of discharge cells,
wherein each of the plurality of discharge cells has (i) a display electrode pair including a scan electrode and a sustain electrode, and (ii) a data electrode, the display electrode pair including a scan electrode and a sustain electrode,
wherein one field period includes two types of subfield, one of the two types of subfield being an all-cell initializing subfield and the other one of the two types of subfield being a selection initializing subfield,
wherein the all-cell initializing subfield has:
    a setup period for causing initializing discharge in all of the plurality of discharge cells,
    an address period for causing addressing discharge in the plurality of discharge cells; and
    a sustain period for causing sustaining discharge in a discharge cell selected in the address period,
wherein the selection initializing subfield has:
    a setup period for causing initializing discharge in the discharge cell where a sustaining operation is performed in the sustain period of the last subfield;
    an address period for selectively causing addressing discharge in the plurality discharge cells; and
    a sustain period for causing sustaining discharge in a discharge cell selected in the address period,
wherein, in the setup period of the all-cell initializing subfield, an increasing ramp waveform voltage is applied to the scan electrodes,
the driving method comprising:
    varying a maximum voltage of the ramp waveform voltage; and
    varying a voltage applied to the data electrodes while the ramp waveform voltage is applied to the scan electrodes,
wherein the varying the maximum voltage of the ramp waveform voltage generates the ramp waveform voltage so that the maximum voltage of the ramp waveform voltage is made smaller when a predetermined image establishing a previously determined condition is displayed than when a normal image other than the predetermined image is displayed, and
wherein the driving the data electrodes, in the case when the predetermined image is displayed, applies a positive voltage, which is greater than a voltage applied to the data electrodes when the normal image is displayed, to the data electrodes while the ramp waveform voltage having the smaller maximum voltage is applied to the scan electrodes.

6. The driving method of the plasma display panel of claim 5,
wherein when a normal image signal is not input, a previously determined mask image is displayed and the mask image is set as the predetermined image.

7. The driving method of the plasma display panel of claim 5, further comprising detecting, for every subfield, a lighting rate of the plurality of discharge cells,
wherein an image where the lighting rate is lower than a previously determined threshold in all of the subfields in one field period is set as the predetermined image.

8. The driving method of the plasma display panel of claim 5, further comprising detecting an average picture level of an image,
wherein an image where the average picture level is lower than a previously determined threshold is set as the predetermined image.

* * * * *